July 25, 1967

E. A. LOFGREEN 3,332,220

COTTON HARVESTER FOR REMOVING LOOSE COTTON FROM THE GROUND

Filed July 2, 1965

INVENTOR
Earston Arthur Lofgreen
BY Scott L. Norviel
atty

July 25, 1967 E. A. LOFGREEN 3,332,220
COTTON HARVESTER FOR REMOVING LOOSE COTTON FROM THE GROUND
Filed July 2, 1965 4 Sheets-Sheet 3
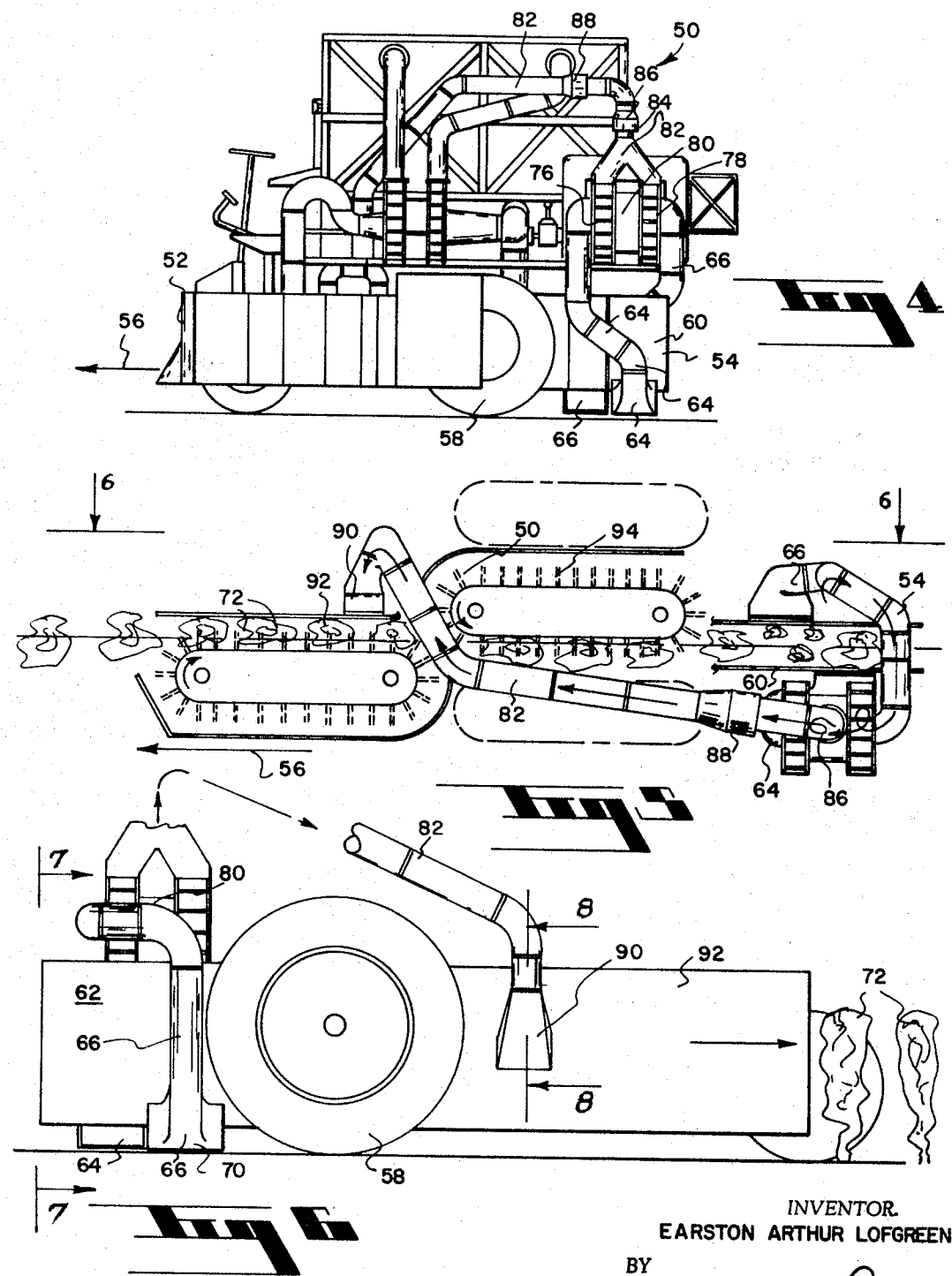
INVENTOR.
EARSTON ARTHUR LOFGREEN
BY
Wm. H. Dean July 25, 1967 E. A. LOFGREEN 3,332,220
COTTON HARVESTER FOR REMOVING LOOSE COTTON FROM THE GROUND
Filed July 2, 1965 4 Sheets-Sheet 4
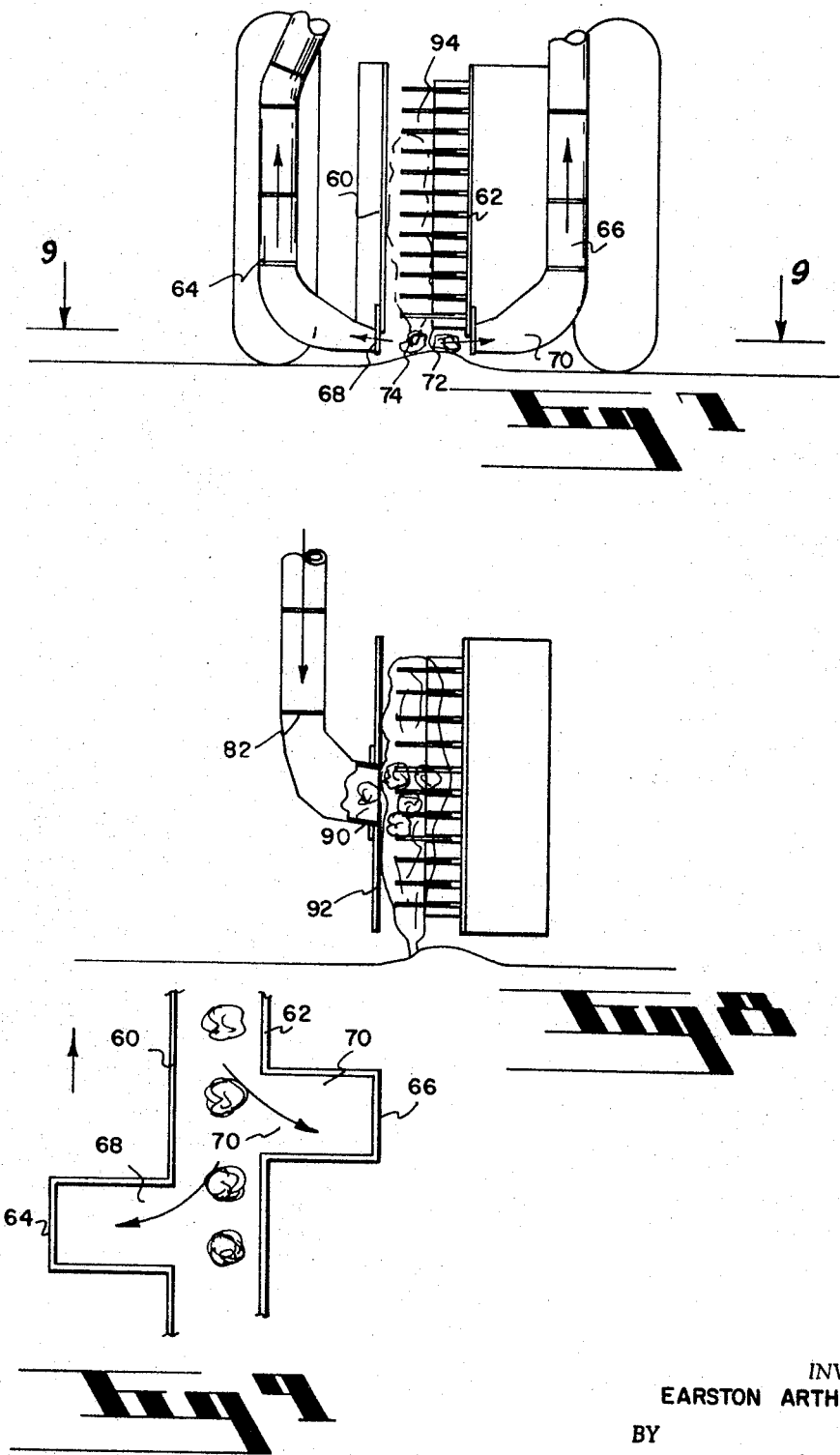
INVENTOR.
EARSTON ARTHUR LOFGREEN
BY
Wm. H. Dean United States Patent Office 3,332,220
Patented July 25, 1967

3,332,220
COTTON HARVESTER FOR REMOVING LOOSE COTTON FROM THE GROUND
Earston Arthur Lofgreen, Box 1207, Coolidge, Ariz. 85228
Filed July 2, 1965, Ser. No. 469,082
8 Claims. (Cl. 56—30)

This is a continuation-in-part of my previous applications Ser. No. 275,605, filed Apr. 25, 1963, and Ser. No. 361,094, filed Apr. 20, 1964, both now abandoned.

This invention concerns a cotton harvester for removing loose cotton from the ground, and from cotton stalks, which has been knocked down by cotton picking machines or the like.

An object is to provide a mechanism including a centrifugal air blower which provides suction that will draw knocked down cotton from the ground and from between the base of the cotton plant stalks and transfer it to picking and cleaning mechanism in other parts of the machine.

Another object is to provide a machine which will produce a current of air to suck the downed cotton tufts from the stalks of the lower part of the cotton plants and transfer this cotton, together with any dried leaves, stems, and other trash, to the picking mechanism of a standard well known picking machine, so that the valuable cotton can be separated from the trash and dirt.

Still another object is to provide a cotton removing mechanism comprising a blower having a suction end with an inlet opening disposed to draw or suck fallen cotton from the cotton plants and an output pipe, combined with an outlet velocity dissipator which will reduce the velocity of the air stream flowing through the conduit pipes, but will not dispel entrained cotton flowing through said pipes.

Another object is to provide a cotton suction arrangement, previously stated, with a velocity dissipator which will slow the velocity of the suction air beyond the blower to a point where the cotton will not "blow through" the picking mechanism whether it be of the spindle type or rod type.

A further object of the invention is to provide a cotton harvester wherein vacuumatic pickup means at the rear-end of the harvester picks up and conveys cotton which has fallen to the ground and into the lower limbs of cotton plants and conveys such cotton into the plants ahead of the picking elements of the harvester, so that the cotton so picked up may be picked from the plants by the spindles or other conventional picking elements of the harvester.

Another object is to provide a cotton harvester in which cotton is vacuumatically picked up from the ground and lower limbs of cotton plants, at high velocity and into the intake of a blower downstream of which air flow reduction means tends to reduce the velocity of the air carrying the picked up cotton; whereupon the cotton may be blown into the plants at a relatively low velocity to prevent the cotton from being blown out of the area of the cotton picking machine and also to permit trash carried with the cotton to impinge upon the cotton plants and fall to the ground, leaving the cotton stuck to or impaled upon branches of the cotton plants and in position to be picked by spindles or other picking means of the cotton harvester.

Another object of the invention is to provide a novel vacuumatic pickup means for cotton harvesters comprising a pair of opposed plates adapted to run on opposite sides of a row of cotton plants and to confine them into close proximity to each other and whereby opposed vacuumatic pickup conduits are provided with opposed open ends adjacent said side plates and directed toward said cotton plants in close proximity thereto and in close proximity to the ground from which the plants grow, whereby the side plates and the open ends of the conduits cooperate very closely to confine the area of vacuumatic pickup of cotton from the lower limbs and ground level adjacent the limbs of the plants, to thereby attain maximum efficiency in retrieving cotton which has fallen to a low level of the cotton plants and onto the ground therebelow.

Still another object is to provide a mechanism, above stated, with supporting pipes and mechanism which will direct the blast of air into and from the blower, so that the suction velocity is great and is sufficient to draw loose cotton off of the ground and the lower part of the stalks and carry the loosened cotton through the mechanism and to the picking mechanism of a commercial cotton picker, such as an International Harvester, or the like, but will not blow the cotton through the picking mechanism and thereby lose it.

Another object of the invention is to provide a cotton harvester which salvages cotton from the ground and lower areas of cotton plants and delivers it to a basket carried by the machine; said cotton arriving at the basket in a very clean condition, thereby causing no loss of grade on cotton samples as compared to those which may be taken from cotton picked by a conventional machine without means for salvaging cotton from the ground.

Another object of the invention is to provide a cotton harvester which gathers cotton which has dropped from the plants and to the ground and which delivers the cotton to a basket on the machine without causing any loss in percent of lint turnout of cotton samples, as compared to that picked by a conventional machine which does not salvage cotton from the ground.

I attain the foregoing objects by means of the parts, devices and combinations of parts shown in the accompanying drawings, in which:

FIG. 4 is a side elevational view of a cotton harvester, in accordance with the present invention;

FIG. 5 is an enlarged diagrammatic plan view of a cotton harvester, in accordance with the present invention;

FIG. 6 is an enlarged fragmentary side elevational view of a cotton harvester, in accordance with the present invention, FIG. 6 being taken from line 6—6 of FIG. 5;

FIG. 7 is a fragmentary enlarged rear-end view of a cotton harvester, in accordance with the present invention;

FIG. 8 is a fragmentary sectional view taken from the line 8—8 of FIG. 6, showing a salvaged cotton delivery conduit of the harvester on enlarged scale and disposed to deliver salvaged cotton into cotton plants ahead of picking elements or mechanism of the harvester; and FIG. 9 is a fragmentary plan sectional view taken from the line 9—9 of FIG. 7.

Figure 3:
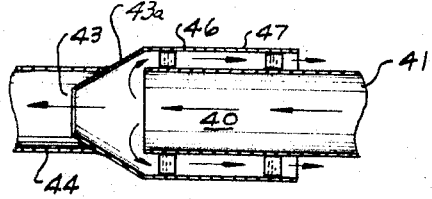
FIG. 3 is a vertical section of one of the velocity dissipators used in the machine.

It is well-known that if sufficient velocity is generated in an air stream, so that it will suck cotton off the ground and from the stems of cotton plants growing in the ground, and if this suction is generated by a centrifugal blower having an inlet and an outlet, the outlet velocity will be so great that the cotton cannot be stopped and lodged in the picking mechanism of the picking machine, but will "blow through" and be lost. It is also well-known that the cotton sucked from the plants must be entrained in the air stream and kept moving with sufficient velocity to go through the centrifugal blower and adjacent connection pipes, but at the same time, its velocity must be reduced so that it will be presented to the picking mechanism at a speed whereby the entrained cotton can be caught and removed by the picking mechanism. This is true whether the picking mechanism comprises toothed spindles or rods on which a sticky fluid is spread.

This invention comprises a combination of parts, as above stated, which will accomplish said objectives.

In the drawings, 2 indicates a blower of the type usually carried on and operative in a picking machine of any well-known type. The blower is driven by belt 12, operated from shaft 50 which may be any power driven shaft on the picker engine (not shown). 3 indicates one side of the intake and 4 the opposite side.

Nozzles 5 and 5a are positioned on the intake pipes 3 and 4 so as to present nozzle openings which will face the base of the cotton plants growing in a row 7 and the lower part 8 of the cotton plants growing in said row.

As herewith illustrated, the blower 2 is driven by power supplied through drive shaft 10 and transmitted through belt 12.

To dislodge loose cotton, an inlet velocity of 8800 f.p.m. in nozzle openings 5 and 5a is usually necessary. The outlet of exhaust pipe 14 will, under these conditions, have an air stream which has so much velocity that the entrained cotton will be blown through the mechanism of the picking machine. It is, therefore, necessary to provide a means for slowing the velocity of this cotton without, however, reducing the velocity to a point where it will not transport the cotton particles through the piping. Therefore, I provide the velocity reducer or dissipator 20 which is connected in the outlet pipe 14, and joins it to the outlet elbow fitting 21. In order to further reduce the velocity of the outlet air stream, I provide a second velocity dissipator 25 in the elbow portion 26. From this dissipator, the air stream, with entrained cotton, drops into the centrifugal separator 28 of the conical centrifugal type. In this centrifugal separator, the cotton and other particles entrained in the air draft drop out the discharge 30. It is to be noted that the centrifugal separator operates vertically. A bypass 32 connects the final pipe 33 to the conical receiver 29. A valve 34 is positioned in the pipe 33, so that the air flowing through pipe 33 can be easily regulated.

Some of the light air entrained particles may be discharged through the pipe 33; however, the bypass 32 permits flow from the pipe 33 into the conical receiver 29 depending upon the relative open or closed operation of the valve 34.

Figure 1:
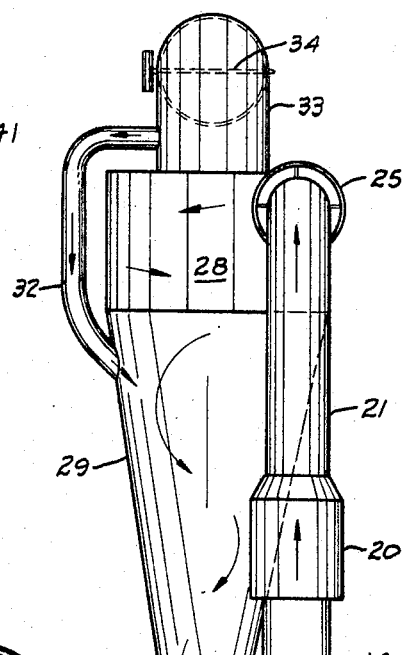
FIG. 1 is a side elevational view of the mechanism adapted for attachment to a cotton picking machine of the type therein concerned that will attain the objects here desired.
Figure 1:
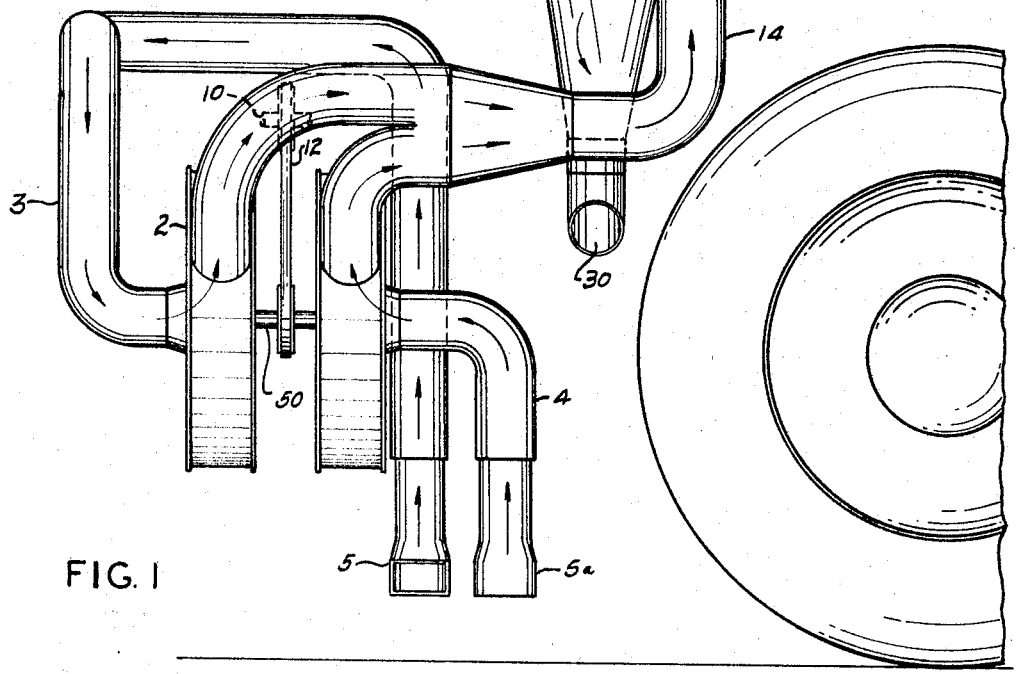

The velocity dissipators 20 and 25 are each made the same. The main channel 40 in each receives air from the pipe 41 (FIG. 3) which may be similar to pipe 14, shown in FIG. 1. The velocity is sufficient in this pipe so that any entrained cotton is carried through the orifice 43 and on out through the pipe 44. However, there is a jacket area 46 formed by sleeve 47 surrounding pipe 41 which receives and transfers a predetermined amount of air. This is governed by the size of the orifice outlet 43.

Figure 2:
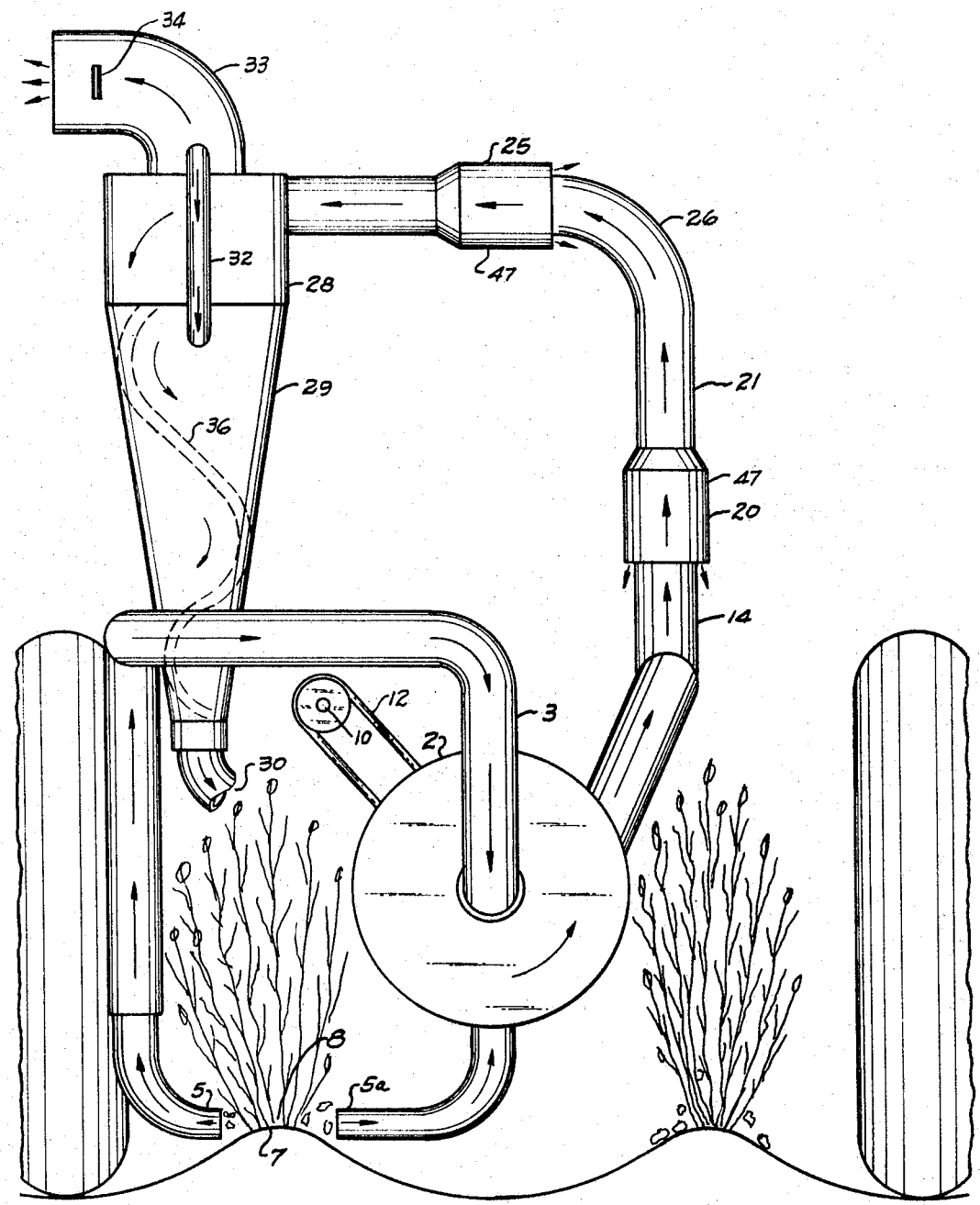
FIG. 2 is a rear elevational view thereof.

In the velocity dissipator, marked 20, the velocity of the air stream flowing through pipe 14 is reduced approximately 30 percent. In the velocity dissipator 25, velocity is reduced 20 percent. The remaining velocity transfers the entrained cotton, etc., to the top of the centrifugal separator 28. Rib 36 is a stationary one-half inch strip of metal which is attached to the wall of the conical receiver in a serpentine-like curve. The function of the rib is to guide and slow up the cotton which flows from top to bottom, so that the cotton does not clog and may be expelled outward of the pipe 30 in an even flow. In the modification shown in FIGS. 1 and 2, the cotton and trash expelled from the pipe 30 is delivered by the pipe 30 to a conventional cotton picking machine or to cotton plants in the picked portions thereof. The valve 34 is of the butterfly type and simply restricts the flow through the pipe 33, but does not shut the flow off entirely.

Each of the velocity dissipators has an outlet opening 43 of restricted diameter to restrain the main flow through pipe 41, and a cylindrical sleeve-jacket 47 connected through a funnel-like transition piece 43a between pipe 43 and the outer end of jacket 47. Air flows around the end of pipe 40 and outward through the space between pipe 41 and jacket 47. The total square inch area of the outer end of sleeve-jacket 47, less the area of pipe 40, should be ten percent less than the area of the outlet opening 43, so that entrained cotton will go into pipe 44 and will not plug up annular jacket 47.

In order to keep cotton moving through separator 29, I employ the valve 34 in elbow 33, the pressure by-pass pipe 32 and the spiral strip 36 disposed on the inner surface of the funnel-shaped lower part of the cylinder. The valve 34 diminishes flow of air out of elbow 33 and creates a slight comparative back pressure. Pipe 32 adds pressure to the top of the funnel-like lower portion 29 of separator 28 and maintains a downdraft through the cylinder. The three elements 34, 32 and 36, working together, prevent the formation of a rotating ring of cotton in the upper part of funnel-like part 29. The downdraft keeps the moving particles of cotton separated and keeps them from forming a ring and plugging up the cylinder and keeps them moving toward outlet 30.

The annular leaf jacket 47 forms an effective auxiliary exhaust opening and reduces the velocity of the air flow from exhaust pipe 44.

In use, the machine is operated close to cotton plants 8. Suction is regulated to draw loose cotton from the ground and the plants and goes to outlet pipe 30. From this pipe, it enters the picking mechanism (not shown) of the picker at a reduced velocity.

As shown in FIG. 4 of the drawings, a cotton harvester of the invention generally designated at 50 is provided with a forward end 52 and a rear-end 54 and the machine, when in operation, travels in the direction of an arrow 56.

Traction wheels 58 of the harvester 50 support and drive the machine in a manner conventional to cotton harvesters, such as the well-known Rust machine, or others, which may employ various picking mechanism, such as rotating rods or spindles.

The invention comprises, generally, a cotton harvester having a pair of spaced plates 60 and 62 at the rear portion 54 of the harvester. These plates 60 and 62 are disposed to operate at opposite sides of a row of cotton plants and are so spaced that these plates hold the cotton plants in confined position, such that a vacuumatic pickup conduits 64 and 66, at their open ends 68 and 70, may be held in close proximity to a row of plants 72, and in close proximity to the ground level 74, in order to attain optimum vacuumatic operation in and around the lower branches of the cotton plants and the surface of the ground therebelow.

As shown in FIG. 9 of the drawings, the vacuumatic pickup conduits 64 and 66, at their open ends 68 and 70, are offset longitudinally relative to the longitudinal or forward and rearward axis of the machine. Thus, the open end 70 is forward relative to the open end 68 or they may be arranged vice versa, as desired, so that the vacuumatic operation is not in direct opposition between the plates 60 and 62 adjacent to which the respective openings 68 and 70 are disposed.

In this manner, the vacuumatic pickups, at their open ends 68 and 70, vacuumatically entrain cotton in the air between the plates 60 and 62, which hold the plants in close proximity to each other and permitting the open ends 68 and 70 to be relatively close to the stalks at the ground level and to thereby provide for very efficient pickup of cotton from the lower limbs of the plants and from the surface of the ground. It being noted that the pickup openings 68 and 70 are at the rearward portion of the machine and follow all of the spindles and thereby collect cotton, which has normally fallen to the ground and also that which may have been knocked to the ground by the spindles during the normal operation thereof, as they proceed ahead of the openings 68 and 70 of the vacuumatic pickup 64 and 66, respectively.

The offset fore and aft relationship of the opening 70 and 68 greatly extends and provides for efficiency of operation of these vacuumatic pickups and prevents them from directly opposing each other and, thus, the pickups 68 and 70 operate most effectively when offset forwardly and rearwardly relative to each other, as shown in FIG. 9 of the drawings.

The vacuumatic pickup conduits, at their open ends 68 and 70, are disposed at the rearward portion 54 of the machine 50 in order to pick up any and all of the cotton which has been knocked from the cotton plants down to a lower level of the branches therein and onto the ground therebelow. The conduits 64 and 66 communicate with respective inlet portions 76 and 78 of the blower means 80, which may be a double inlet blower of the conventional centrifugal type. This blower means 80 is provided with a common outlet 82 communicating with an air delivery conduit 84 in which a pair of series connected air velocity reduction devices 86 and 88 are disposed. These air velocity reduction devices, or means, 86 and 88 are similar in construction to the velocity dissipators 20 and 25 disclosed in FIG. 2 of the drawings.

Referring to FIG. 3 of the drawings, it will be seen that a conduit continuity portion 41 is provided with a delivery opening disposed in a conical portion 43a of a sleeve 46 which is radially spaced outward from the conduit continuity portion 41 to permit air to pass outwardly in a reverse flow direction to that indicated by arrows in the conduit portion 41. The conical portion 43a exhausts into a tubular conduit 44, which is a continuity of the air delivery conduit leaving from the outlet 84 of the blower 80, all as will be hereinafter described in detail.

Downstream from the air velocity reduction means 88, the conduit 82 extends to a delivery end 90, shown in FIG. 6 of the drawings, this end 90 being coupled to a side plate 92 of the machine or harvester, all as shown best in FIGS. 4, 5 and 6 of the drawings. The delivery end 90 opens into the interior of the harvester 50, inwardly of the side plate 92 and into communication with the cotton plants 72 forwardly with relation to picking mechanism 94 of the machine. It being noted that the machine, as shown in FIG. 5 is travelling in the direction of the arrow 56. It will be seen from FIG. 5, that the vacuumatic pickup conduits 64 and 66 have their open ends disposed at the rear portion 54 of the machine adjacent to the side plates 60 and 62, so that any of the cotton knocked to the ground or to the lower limbs of the plants by the picking mechanism 94 will be retrieved and returned to a location of the plants 72 ahead of the picking mechanism 94.

In this operation, the blower means 80 produces a high velocity at the inlet which provides high vacuum at the open ends 68 and 70 of the pickup conduits 64 and 66. This causes entrainment of foreign matter, such as leaves, small sticks and other material, commonly known as trash and dirt. As the cotton, together with the trash, travels through the blower and to the outlet 84, the air velocity reduction means 86 and 88 causes dissipation of the air pressure and air flow velocity, along with considerable dust and fine particles of trash and leaves carried by the escaping air, as indicated and previously described in connection with FIG. 3 of the drawings, while the cotton and heavier trash proceeds in the conduit 82 toward the delivery open end 90 and when the cotton, together with the trash, is expelled into the plants 72, the trash being heavier falls to the ground, while the cotton being a fibrous material clings to the limbs of the plants and is subsequently picked by the the mechanism 94. Thus, the cotton picked from the ground, by the vacuumatic pickup conduits 64 and 66 is fairly cleaned by forcing the cotton, together with the trash, to impinge upon the plants 72 before it is again traversed by the picking mechanism 94. It will be appreciated by those skilled in the art that the air flow reduction means 86 and 88 provides for sufficient air flow reduction, such that the cotton, passing through the delivery opening 90 and inwardly relative to the plate 92, reaches the cotton plants 72 at such a low velocity that the cotton is not blown out of the machine or out of the area of the cotton plants 72 and is, thus, very efficiently collected by the plants, while the trash falls to the ground. It will also be appreciated by those skilled in the art that the opposed open ends 68 and 70 of the vacuumatic pickup conduits 64 and 66 provide for optimum vacuumatic removal of cotton from the lower limbs of cotton plants and the surface of the ground adjacent thereto and that the side plates 60 and 62, being disposed to confine the area of the cotton plants, permits the open ends 68 and 70 of the vacuumatic pickup conduits 64 and 66 to be placed in close proximity to each other to attain maximum vacuumatic operation.

It will be obvious to those skilled in the art that various modifications of the present invention may be resorted to in a manner limited only by a just interpretation of the following claims.

I claim:

1. In a cotton harvester, the combination of: a mobile machine having forward and rearward ends; picking mechanism carried by said machine and adapted to pick cotton from cotton plants; vacuumatic pickup conduits located in the proximity of the rear-end of said machine, said conduits having open ends disposed in opposed faced relation to each other; one of said open ends of one of said conduits being offset forwardly relative to the other, said conduits carried by said machine in positions to move at opposite sides of a row of cotton plants with said open ends directed toward said plants, said open ends disposed at a location on said machine adjacent the ground; side plates disposed in spaced relation to each other to confine the cotton plants into a narrow row in the area of said open ends so that said open ends may be operated in close proximity to each other to attain maximum vacuumatic operation between said side plates; blower means having air inlet means communicating with said conduits; said blower means having outlet means; a delivery conduit coupled to said outlet means; and a delivery end of said delivery conduit disposed to deliver cotton into cotton plants in an area of said machine forwardly relative to said picking mechanism.

2. In a cotton harvester, the combination of: a mobile machine having forward and rearward ends; picking mechanism carried by said machine and adapted to pick cotton from cotton plants; vacuumatic pickup conduits located in the proximity of the rear-end of said machine, said conduits having open ends disposed in opposed facing relation to each other; one of said open ends of one of said conduits being offset forwardly relative to the other, said conduits carried by said machine in positions to move at opposite sides of a row of cotton plants with said open ends directed toward said plants, said open ends disposed at a location on said machine adjacent the ground; side plates ahead of said open ends and disposed to confine plants in close proximity to each other to attain a relatively close relationship of said open ends relative to each other; blower means having air inlet means communicating with said conduits; said blower means having outlet means; a delivery conduit coupled to said outlet means; air velocity reduction means in said delivery conduit to reduce the velocity of air and cotton travelling from said blower; and a delivery end of said delivery conduit disposed to deliver cotton into cotton plants at low velocity in an area of said machine forwardly relative to said picking mechanism.

3. In a cotton harvester, the combination of: a mobile machine having forward and rearward ends; picking mechanism carried by said machine and adapted to pick cotton from cotton plants; vacuumatic pickup conduits located in the proximity of the rear-end of said machine, said conduits having open ends disposed in opposed facing relation to each other; said conduits carried by said machine in positions to move at opposite sides of a row of cotton plants with said open ends directed toward said plants, said open ends disposed at a location on said machine adjacent the ground; blower means having air inlet means communicating with said conduits; said blower means having outlet means; a delivery conduit coupled to said outlet means and a delivery end of said delivery conduit disposed to deliver cotton into cotton plants in an area of said machine forwardly relative to said picking mechanism; and side plate means disposed for confining flow at said delivery end of said delivery conduit to contain cotton delivered therefrom in an area of cotton plants forwardly relative to said picking mechanism.

4. In a cotton harvester, the combination of: a mobile machine having forward and rearward ends; picking mechanism carried by said machine and adapted to pick cotton from cotton plants; vacuumatic pickup conduits located in the proximity of the rear-end of said machine, said conduits having open ends disposed in opposed facing relation to each other; said conduits carried by said machine in positions to move at opposite sides of a row of cotton plants with said open ends directed toward said plants, said open ends disposed at a location on said machine adjacent the ground; blower means having air inlet means communicating with said conduits; said blower means having outlet means; a delivery conduit coupled to said outlet means; air velocity reduction means disposed in said delivery conduit for reducing the velocity of air and cotton travelling through said delivery conduit; and a delivery end of said delivery conduit disposed to deliver cotton into cotton plant in an area of said machine forwardly relative to said cotton picking mechanism whereby said air velocity reduction means prevents undue air velocity from blowing the cotton delivered by said delivery conduit out of the area of said machine and said cotton plants; and side plate means disposed for confining flow at said delivery end of said delivery conduit to contain cotton delivered therefrom in an area of cotton plants forwardly relative to said picking mechanism.

5. In a cotton harvester, the combination of: a mobile machine having forward and rearward ends; picking mechanism carried by said machine and adapted to pick cotton from cotton plants; vacuumatic pickup conduits located in the proximity of the rear-end of said machine, said conduits having open ends disposed in opposed facing relation to each other; said conduits carried by said machine in positions to move at opposite sides of a row of cotton plants with said open ends directed toward said plants, said open ends disposed at a location on said machine adjacent the ground; side plates ahead of said open ends and disposed to confine plants in close proximity to each other to attain a relatively close relationship of said open ends relative to each other; blower means having air inlet means communicating with said conduits; said blower means having outlet means; a delivery conduit coupled to said outlet means; air velocity reduction means in said delivery conduit to reduce the velocity of air and cotton travelling from said blower; and a delivery end of said delivery conduit disposed to deliver cotton into cotton plants at low velocity in an area of said machine forwardly relative to said picking mechanism; and side plate means disposed for confining flow at said delivery end of said delivery conduit to contain cotton delivered therefrom in an area of cotton plants forwardly relative to said picking mechanism.

6. In a cotton harvester, the combination of: a mobile machine having forward and rearward ends; picking mechanism carried by said machine and adapted to pick cotton from cotton plants; vacuumatic pickup conduits located in the proximity of the rear-end of said machine, said conduits having open ends disposed in opposed facing relation to each other; said conduits carried by said machine in positions to move at opposite sides of a row of cotton plants with said open ends directed toward said plants, said open ends disposed at a location on said machine adjacent the ground; blower means having air inlet means communicating with said conduits; said blower means having outlet means; a delivery conduit coupled to said outlet means; air velocity reduction means disposed in said delivery conduit for reducing the velocity of air and cotton traveling through said delivery conduit; and a delivery end of said delivery conduit disposed to deliver cotton into cotton plants in an area of said machine forwardly relative to said cotton picking mechanism whereby said air velocity reduction means prevents undue air velocity from blowing the cotton delivered by said delivery conduit out of the area of said machine and said cotton plants; said air velocity reduction means comprising a plurality of air velocity reduction devices in series in said delivery conduit.

7. In a cotton harvester, the combination of: a mobile machine having forward and rearward ends; picking mechanism carried by said machine and adapted to pick cotton from cotton plants; vacuumatic pickup conduits located in the proximity of the rear-end of said machine, said conduits having open ends disposed in opposed facing relation to each other; said conduits carried by said machine in positions to move at opposite sides of a row of cotton plants with said open ends directed toward said plants, said open ends disposed at a location on said machine adjacent the ground; blower means having air inlet means communicating with said conduits; said blower means having outlet means; a delivery conduit coupled to said outlet means and a delivery end of said delivery conduit disposed to deliver cotton into cotton plants in an area of said machine forwardly relative to said picking mechanism; a pair of side plates carried by said machine and disposed to run in spaced relation to each other longitudinally along opposite sides of plants of a row of cotton plants and disposed to hold said plants in closely confined disposition; said last mentioned plates adapted to thereby restrain said cotton plants near ground level so that said open ends of said vacuumatic pickup conduits are in close proximity to said plants at opposite sides of the plant row.

8. In a cotton harvester, the combination of: a mobile machine having forward and rearward ends; picking mechanism carried by said machine and adapted to pick cotton from cotton plants; vacuumatic pickup conduits located in the proximity of the rear-end of said machine, said conduits having open ends disposed in opposed facing relation to each other; said conduits carried by said machine in positions to move at opposite sides of a row of cotton plants with said open ends directed toward said plants, said open ends disposed at a location on said machine adjacent the ground; blower means having air inlet means communicating with said conduits; said blower means having outlet means; a delivery conduit coupled to said outlet means and a delivery end of said delivery conduit disposed to deliver cotton into cotton plants in an area of said machine forwardly relative to said picking mechanism; a pair of side plates carried by said machine and disposed to run in spaced relation to each other longitudinally along opposite sides of plants of a row of cotton plants and disposed to hold said plants in closely confined disposition; said last mentioned plates adapted to thereby restrain said cotton plants near ground level so that said open ends of said vacuumatic pickup conduits are in close proximity to said plants at opposite sides of the plant row; said open ends of said vacuumatic pickup conduits directed generally in a horizontal direction to receive air and cotton in a horizontal direction relative to the lower areas of cotton plants and adjacent to the ground.

References Cited
UNITED STATES PATENTS

| | | | |
|---|---|---|---|
| 444,038 | 1/1891 | Beach | 302.1 |
| 494,274 | 3/1893 | Kelly | 302.1 |
| 1,107,083 | 8/1914 | Lovejoy | 56—30 |
| 2,058,514 | 10/1936 | Rust et al. | 56—14 |
| 2,175,216 | 10/1939 | Rust | 56—14 |
| 2,673,436 | 3/1954 | Urban | 56—12 |
| 2,689,439 | 9/1954 | Martin | 56—12 |
| 2,741,888 | 4/1956 | Hamel et al. | 56—12 |
| 3,040,505 | 6/1962 | De Tuncq et al. | 56—28 |
| 3,100,368 | 8/1963 | Logan | 56—12 |
| 3,144,742 | 8/1964 | Zeismer | 56—12 |

ABRAHAM G. STONE, *Primary Examiner.*

RUSSELL R. KINSEY, *Assistant Examiner.*